United States Patent
Czajkowski

(10) Patent No.: US 7,318,169 B2
(45) Date of Patent: Jan. 8, 2008

(54) FAULT TOLERANT COMPUTER

(76) Inventor: David Czajkowski, 332 Alviso Way, Encinitas, CA (US) 92024

( * ) Notice: Subject to any disclaimer, the term of this patent is extended or adjusted under 35 U.S.C. 154(b) by 372 days.

(21) Appl. No.: 10/435,626

(22) Filed: May 6, 2003

(65) Prior Publication Data

US 2004/0153747 A1   Aug. 5, 2004

Related U.S. Application Data

(60) Provisional application No. 60/442,727, filed on Jan. 28, 2003, provisional application No. 60/408,205, filed on Sep. 5, 2002, provisional application No. 60/380,476, filed on May 15, 2002.

(51) Int. Cl.
    *G06F 11/00*      (2006.01)
(52) U.S. Cl. .......................... 714/17; 714/21
(58) Field of Classification Search ................ 714/16, 714/17, 21, 822
    See application file for complete search history.

(56) References Cited

U.S. PATENT DOCUMENTS

| | | | | |
|---|---|---|---|---|
| 4,132,975 A | * | 1/1979 | Koike | 714/797 |
| 4,616,312 A | * | 10/1986 | Uebel | 714/11 |
| 4,670,880 A | * | 6/1987 | Jitsukawa et al. | 714/797 |
| 4,817,094 A | * | 3/1989 | Lebizay et al. | 714/797 |
| 4,943,969 A | * | 7/1990 | Criswell | 714/820 |
| 4,959,836 A | * | 9/1990 | Berard et al. | 714/822 |
| 5,235,220 A | * | 8/1993 | Takizawa | 326/35 |
| 5,414,722 A | * | 5/1995 | Tollum | 714/822 |
| 5,706,423 A | * | 1/1998 | Sugimoto | 714/49 |
| 6,754,846 B2 | * | 6/2004 | Rasmussen et al. | 714/11 |
| 2005/0055607 A1 | * | 3/2005 | Czajkowski et al. | 714/25 |
| 2005/0138485 A1 | * | 6/2005 | Osecky et al. | 714/48 |
| 2005/0172196 A1 | * | 8/2005 | Osecky et al. | 714/746 |

FOREIGN PATENT DOCUMENTS

GB     2 903 614   *  9/1982

OTHER PUBLICATIONS

Mukherjee et al.; "Detailed Design and Evaluation of Redundant Multithreading Alternatives"; International Conference on Computer Architecture, Proceedings of the 29th Annual International Symposium on Computer Architecture; published 2002; pp. 99-110.*

Reinhardt et al.; "Transient Fault Detection Via Simultaneous Multithreading"; International conference on Computer Architecture, Proceedings of the 27th Annual International Symposium on Computer Architecture; published 2000; pp. 25-36.*

* cited by examiner

*Primary Examiner*—Scott Baderman
*Assistant Examiner*—Joshua Lohn
(74) *Attorney, Agent, or Firm*—The Nath Law Group; Robert P. Cogan

(57) ABSTRACT

A new method for the detection and correction of errors or faults induced in a computer or microprocessor caused by external sources of single event upsets (SEU). This method is named Time-Triple Modular Redundancy (TTMR) and is based upon the idea that very long instruction word (VLIW) style microprocessors provide externally controllable parallel computing elements which can be used to combine time redundant and spatially redundant fault error detection and correction techniques. This method is completed in a single microprocessor, which substitute for the traditional multi-processor redundancy techniques, such as Triple Modular Redundancy (TMR).

7 Claims, 4 Drawing Sheets ial uses in the VLIW microprocessor in at different clock cycles, a first and at least a second memory device in communication with the microprocessor, the first memory device configured to store the first instruction, the second memory device configured to store at least the second instruction, a software instruction to compare the first
FAULT TOLERANT COMPUTER

CROSS REFERENCE TO RELATED APPLICATIONS

This application claims priority to U.S. Provisional Patent Application No. 60/380,476, filed on May 15, 2002 now abandoned U.S. Provisional Patent Application No. 60/408, 205, filed on Sep. 5, 2002, entitled "Functional Interrupt Mitigation for Fault Tolerant Computer," naming David Czajkowski as first named inventor, and U.S. Provisional Patent No. 60/442,727, filed on Jan. 28, 2003, each of which is hereby incorporated by reference in its entirety.

BACKGROUND OF THE INVENTION

During use, microprocessors may be exposed to external conditions which may cause internal data bits within or being processed by the microprocessor to change. Commonly, these events are classified as single event upsets (SEU). Conditions giving rise to SEU may include ambient radiation (including protons, x-rays, neutrons, cosmic rays, electrons, alpha partciles, etc.), electrical noise (including voltage spikes, electromagnetic interference, wireless high frequency signals, etc.), and/or improper sequencing of electronic signals or other similar events. The effects of SEU conditions can include the processing of incorrect data or the microprocessor may temporarily or permanent hang, which may be reference to as single event functional interrupt (SEFI), for a temporary or permanent condition.

A number of solutions to avoid or correct for these events have been developed, and include modifying the manufacturing process for the microprocessor. For example, microprocessor may utilize temporal redundancy or spatial redundancy in an effort to mitigate the likelihood of SEUs. While these systems have proven somewhat effective in reducing or avoiding SEU and SEFI events, several shortcomings have been identified. For example, radiation tolerant integrated circuits (IC) processes historically lag commercial devices by two to three generations. More specifically, today's radiation-tolerant IC production processes produce devices utilizing 0.35 micrometer geometries while non-radiation tolerant devices typically utilize 0.13 micro-meter geometry. The effect of the larger geometry is much slower performance and higher power consumption for the microprocessor.

In light of the foregoing, there is an ongoing need for high performance, low power consumption radiation tolerant systems and devices.

BRIEF SUMMARY OF THE INVENTION

The present application discloses fault tolerant computer systems and method of use. In one embodiment, a computer system with improved fault tolerance from microprocessor data errors is disclosed and includes a microprocessor, a fault tolerant software routine configured to send a first instruction and at least a second instruction to the microprocessor, the first and at least the second instructions being identical and spatially separated from functional computational units of the VLIW microprocessor in at different clock cycles, a first and at least a second memory device in communication with the microprocessor, the first memory device configured to store the first instruction, the second memory device configured to store at least the second instruction, a software instruction to compare the first instruction to at least the second instruction, and a comparitor to compare the first instruction to the second instruction.

In another embodiment, a software and hardware computer system with improved fault tolerance from microprocessor data errors is disclosed and includes a very long instruction word microprocessor, a fault tolerant software routine comprising a first instruction and a second instruction, each inserted into two spatially separate functional computational units in the VLIW microprocessor at two different clock cycles and stored in a memory device in communication with the microprocessor, the first and second instructions being identical, a software instruction to compare the first and second instruction in the memory device in communication with a VLIW microprocessor compare or branch units, and configured to perform an action if the first and second instruction match, the fault tolerant software routine comprising a third inserted into a third spatially separate functional computational units in the VLIW microprocessor at a third different clock cycles and stored in a third memory device in communication with the microprocessor, the first, second, and third instructions being identical, and the software instruction to compare the first, second, and third instructions in the memory devices in communication with a VLIW microprocessor compare or branch units, and configured to perform an action if any of the first, second and third instructions match.

The present application further discloses a method of processing data in a fault tolerant computer system and includes generating a first instruction at a first time interval, generating a second instruction identical to the first instruction at a second time interval, generating a third instruction identical to the first and second instructions at a third time interval, comparing the first, second and third instructions, matching anyone of the first, second, or third instructions to each other, and performing an action based on the match instruction.

In another embodiment, a method of processing data in a fault tolerant computer system is disclosed and includes generating a first instruction at a first time interval, generating a second instruction identical to the first instruction at a second time interval, comparing the first and second instructions to each other, performing an action based on the matched first and second instructions, generating a third instruction identical to the first and second instructions at a third time interval is the first and second instructions do not match, matching the first, second, and third instructions to each other, and performing an action based on a match between anyone of the first, second, and third instructions.

DETAILED DESCRIPTION OF THE INVENTION

The Time-Triple Modular Redundancy (TTMR) system disclosed herein is an error detection and correction system capable of being implemented in a very long instruction word (VLIW) microprocessors. In one embodiment, the VLIW microprocessor includes specialized software routines known as "ultra long instruction word" and/or "software controlled instruction level parallelism." These software routines include parallel functional units configured to execute instructions simultaneously wherein the instruction scheduling decisions are moved to the software compiler. The TTMR systems combines time redundant and spatially redundant (including TMR and/or Master/Shadow architectures) instruction routines together on a single VLIW microprocessor.

Figure 1:
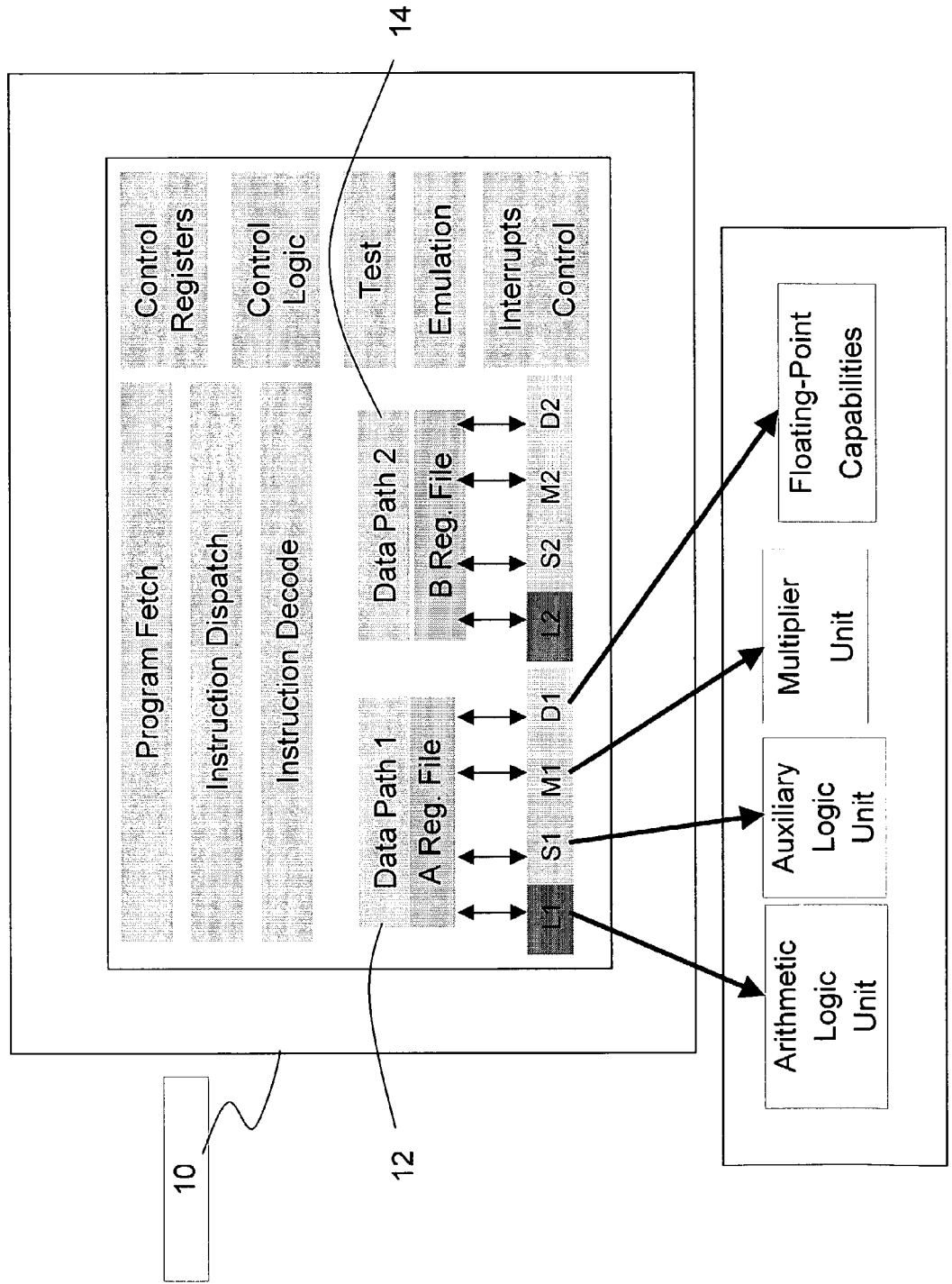
FIG. 1 shows an operational schematic of a microprocessor.

FIG. 1 shows a typical VLIW microprocessor. As shown, the VLIW microprocessor 10 includes a first data path 12 and at least a second data path 14. The first and second data paths 12, 14, respectively, may operate in parallel. Optionally, the first and second data paths 12, 14, respectively, may operate in series. As shown, the first data path 12 includes or is otherwise in communication with a first arithmetic logic unit L1, a first auxiliary logic unit S1, a first multiplier unit M1, and first floating-point capabilities D1. Similarly, the second data path 14 includes or is otherwise in communication with a second arithmetic logic unit L2, a second auxiliary logic unit S2, a second multiplier unit M2, and second floating-point capabilities D2. Exemplary VLIW microprocessors include, for example, th320C6201 manufactured by the Texas Instrument's Corporation, although those skilled in the art will appreciate that the TTMR system disclosed herein is configured to operate with a variety of different VLIW microprocessors having varying architectures.

Figure 2:
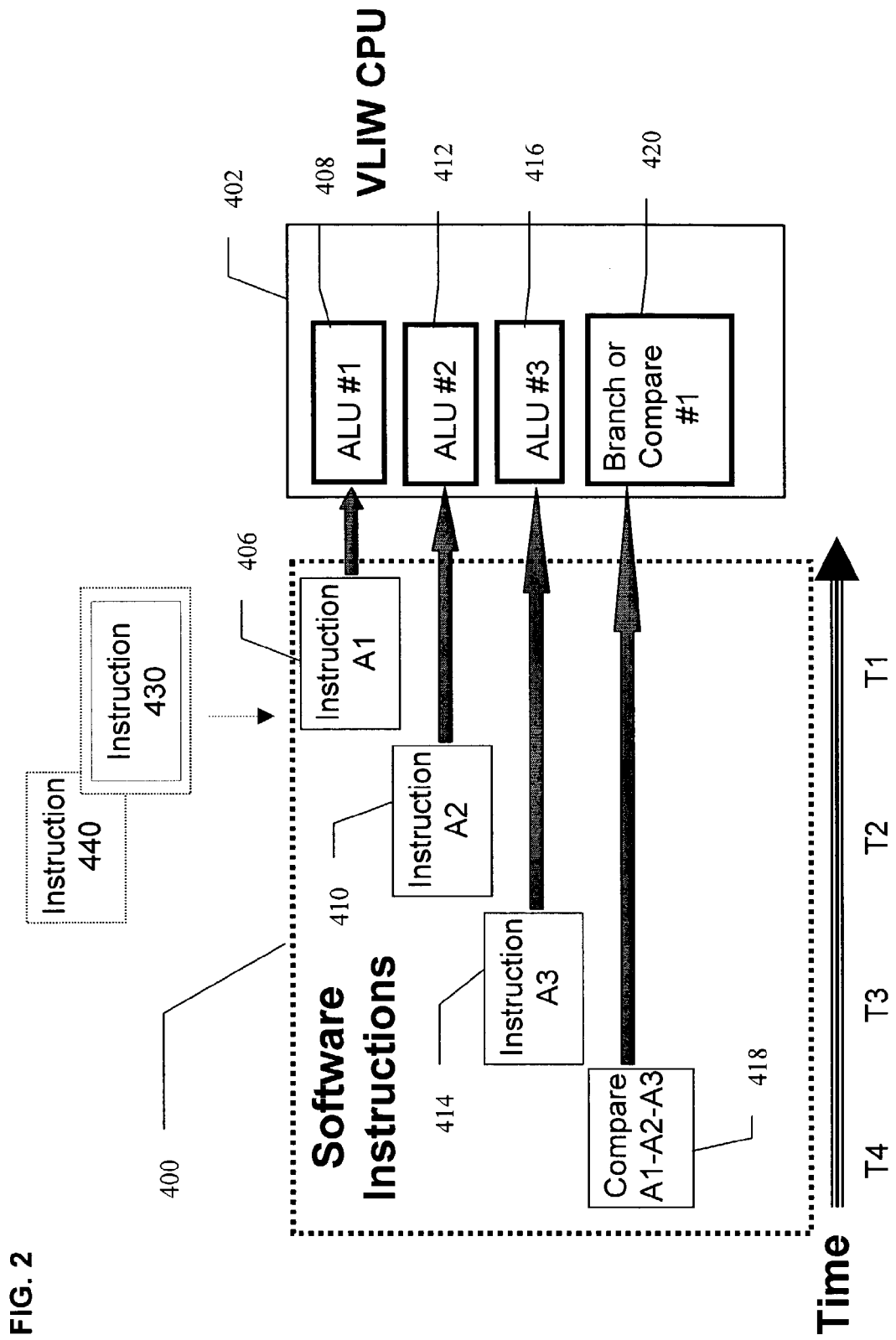
FIG. 2 shows an operational schematic of an embodiment of a TTMR redundant architecture.

FIG. 2 illustrates an operational flowchart of an embodiment of the TTMR software routine. As shown, an instruction may be repeated any number of times across different internal parallel cores in a TMR fashion to provide a basis of comparing one instruction to at least another instruction. However, each repeated instruction is completed during a later clock cycle(s), thereby providing temporal and spatial redundancy. As illustrated, at clock cycle or time T1 a first instruction 406 is sent from a software controller unit 400 to a first arithmetic logic unit 408 within or in communication with a CPU 402. Thereafter, the first instruction is retained by a first memory device in communication therewith. At some later clock cycle or time interval T2, at least a second instruction 410 is sent from a software controller unit 400 to a second arithmetic logic unit 412 within or in communication with a CPU 402 and retained in a second memory device in communication therewith. In the illustrated embodiment, at some later clock cycle or time interval T3, a third instruction 414 is sent from a software controller unit 400 to a third arithmetic logic unit 416 within or in communication with a CPU 402 and retained in a third memory device in communication therewith. The instructions 406, 410, 414, respectively, are identical instructions sent at different time intervals, T1, T2, T3, respectively. Those skilled in the art will appreciate any number greater than 1 of instructions may be sent from the software controller unit 400 to the CPU 402 thereby permitting a comparison of instructions to occur within the CPU 402.

Referring again to FIG. 2, at a later clock cycle or time interval T4 a compare instruction 418 is then sent from the software controller unit 400 to the branch or compare unit 420 within or in communication with the CPU 402. Exemplary branch or compare units 420 may include, without limitation, at least one comparitor in communication with the CPU 402. The branch or compare unit 420 accesses and compares the three instructions retained within the individual memory device in communication with the arithmetic logic units 408, 412, 416, respectively. If all three instruction stored within the individual memory device in communication the arithmetic logic units 408, 412, 416 match no error has occurred and the instruction is accepted and performed. If a discrepancy is detected between the instructions 406, 410, 414, respectively, stored within the individual memory device in communication with the arithmetic logic units 408, 412, 416, the arithmetic logic units 408, 412, 416 are polled to determine which two instructions match. Like TMR and time redundancy systems, in the present system the two matching instructions are assumed to be. Additionally, the TTMR system disclosed herein permits a second instruction 430 and a third instruction 440 to be completed in parallel with the first instruction 406 when three or more parallel functional units are available.

Figure 3:
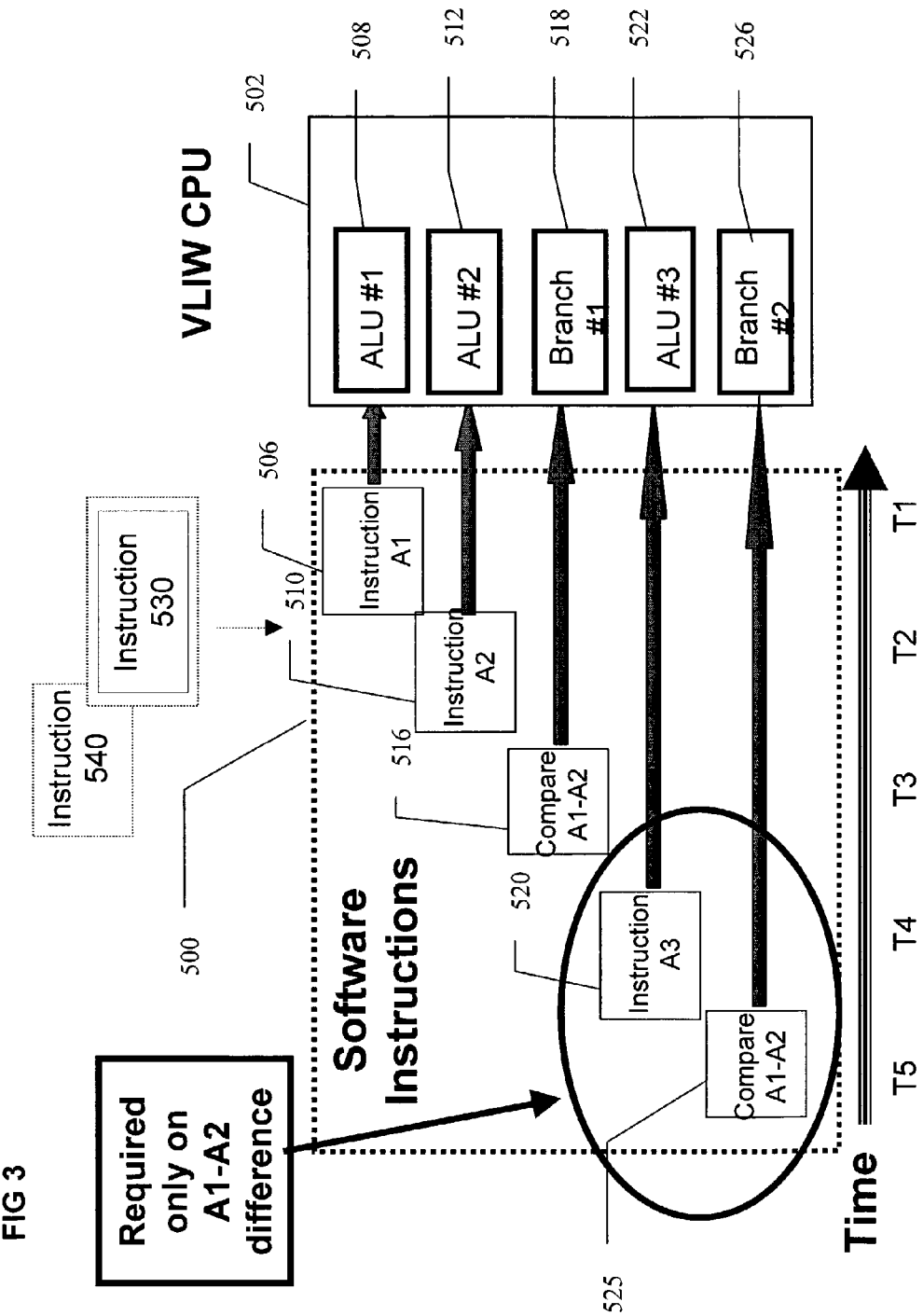
FIG. 3 shows an operational schematic of an embodiment of a TTMR redundant architecture using a Master/Shadow architecture.

FIG. 3 shows an alternate embodiment of a TTMP system using a spatial technique similar to the Master/Shadow method in combination with a time redundancy architecture. In the illustrated embodiment, a TTMR sequence for an instruction is repeated twice across different internal parallel cores, such as arithmetic logic units, in a Master/Shadow fashion. However, each repeated instruction is completed during a later clock cycle or time interval, similar to a time redundancy architecture. As illustrated, at clock cycle or time T1 a first instruction 506 is sent from a software controller unit 500 to a first arithmetic logic unit 508 within or in communication with a CPU 502. Thereafter, the first instruction is retained within a first memory device in communication therewith. At some later clock cycle or time interval T2, at least a second instruction 510 is sent from a software controller unit 500 to a second arithmetic logic unit 512 within or in communication with a CPU 502 and retained a second memory device in communication therewith.

At a later clock cycle or time interval T3, a compare instruction 516 is then sent from the software controller unit 500 to the branch or compare unit 518 within or in communication with the CPU 502. Exemplary branch or compare units 520 may include, without limitation, at least one comparitor in communication with the CPU 502. The branch or compare unit 520 accesses and compares the two instructions retained within the memory devices in communication with arithmetic logic units 508, 512, respectively. If the two instructions stored within the memory devices in communication with the arithmetic logic units 508, 512 match no error has occurred and the instruction is accepted and performed. If a discrepancy is detected between the instructions 506, 510, respectively, stored within the memory devices in communication with the arithmetic logic units 508, 512, a third instruction 520 is sent from a software controller unit 500 to a third arithmetic logic unit 522 within or in communication with a CPU 502 and retained within a third memory device in communication therewith. The third instruction 520 is sent from the software controller unit 500 to the third arithmetic logic unit 522 at a later clock cycle or time interval T4 as compared with time interval T3. The instructions 506, 510, 520, respectively, are identical instructions sent at different time intervals, T1, T2, T4, respectively. Those skilled in the art will appreciate any number greater than 1 of instructions may be sent from the software controller unit 500 to the CPU 502 thereby permitting a comparison of instructions to occur within the CPU 502. The instructions stored within the memory devices in communication with the respective arithmetic logic units 508, 512, 522 are compared and any match therein is assumed to be a correct instruction. thereafter, the instruction may be performed. Like the previous embodiment, the TTMR system disclosed herein permits a second instruction 530 and a third instruction 540 to be completed in parallel with the first instruction 506 when three or more parallel functional units are available.

In another embodiment, the TTMR system may include or otherwise incorporate a SEU watchdog circuit. The SEU watchdog circuit may comprise a separate field programmable gate array (FPGA). In an alternate embodiments, the SEU watchdog circuit may include an application specific integrated circuit (ASIC) or other electronic circuit implementation. The SEU watchdog circuit provides a periodic signal to the microprocessor. For example, a very low duty cycle signal may be sent to the microprocessor. The microprocessor must respond to the SEU watchdog circuit with a correct "answer" in a pre-determined period of time. If the processor is hung in a SEFI, the response from the microprocessor will not be received in within the pre-determined time-period and the circuit will force a series of escalating corrections to regain control of the processor. The escalating corrections may include, without limitation, hardware CPU reset(s), hardware power down cycle(s), activate interrupt signal(s), activate non-maskable interrupt(s), and activate functional unit resets (subsets logic areas of CPU).

Figure 4:
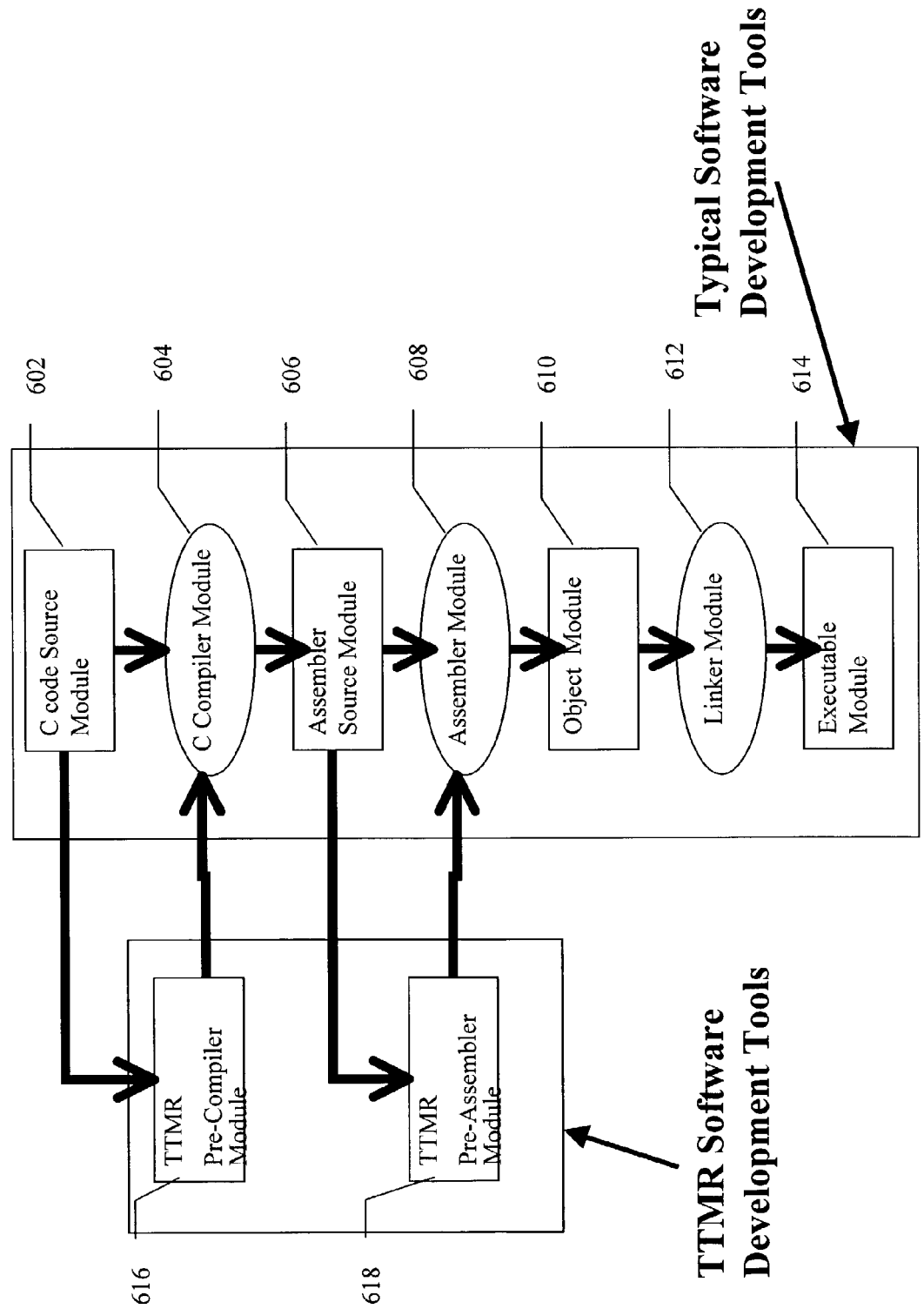
FIG. 4 shows an embodiment of a development flowchart used for developing TTMR software.

Implementation and control of the TTMR system takes place through software control of the VLIW microprocessor. TTMR software code can be developed using a variety of methods, which are dependent upon the individual microprocessor development environment and operating system (s). As shown in FIG. 4, TTMR software may be developed in high level programming languages (examples: Fortran, C, C++, Basic, etc.) or at the microprocessor assembly language (also known as machine code). As shown, the source module 602 may simultaneously sent to the compiler module 604 and the TTMR compiler module 616. The TTMR pre-compiler module 616 amends the data received from the source module to include the TTMR instruction set and sends the modified data module to the compiler module 604. The compiler module 604 compiles both the source data and the modified source data producing an assembler source module 606 and a TTMR pre-assembler module 618. The assembler source module 606 is sent to the assembler module 608. The TTMR pre-assembler module 618 scheduled and insert a TTMR format into the data received from the assembler source module 606 and forward the modified data to the assembler module 608. Thereafter, the assembler module 608 produces an object data module 610 which may be forwarded to a linker module 612. The linker odule outputs an exectuable file module 614. To facilitate and simplify programming for users, automated development and management of TTMR instruction sets and cycles may be accomplished by the addition of a "Pre-Compiler" or "Pre-Assembler", where the original (no TTMR) software code is automatically duplicated and scheduled in a TTMR format, (for a C code language system as an example).

What is claimed is:

1. A computer system with improved fault tolerance from microprocessor data errors, comprising: a microprocessor; a fault tolerant software routine configured to send a first instruction and at least a second instruction to the microprocessor, the first and at least the second instructions being identical and inserted into spatially separated functional computational units of a VLIW microprocessor at different clock cycles; a first and at least a second memory device in communication with the microprocessor, the first memory device configured to store the first instruction, the second memory device configured to store at least the second instruction; a software instruction to compare the first instruction to at least the second instruction; and a comparator to compare the first instruction to the second instruction.

2. The system of claim 1 further comprising a third instruction sent by the fault tolerant software routine to the microprocessor, the third instruction stored in a third memory device in communication with the microprocessor.

3. The system of claim 2 wherein the software instruction directs the comparator to compare the first, second, and third instruction.

4. The system of claim 3 wherein a match of any of the first, second, and third instructions is accepted by the microprocessor.

5. The system of claim 1 wherein the VLIW microprocessor comprises a first, a second and a third spatially separated functional computational unit.

6. A software and hardware computer system with improved fault tolerance from microprocessor data errors, comprising: a very long instruction word (VLIW) microprocessor; a fault tolerant software routine comprising a first instruction and a second instruction, each inserted into two spatially separate functional computational units in the VLIW microprocessor at two different clock cycles and stored in a memory device in communication with the microprocessor, the first and second instructions being identical; a software instruction to compare the first and second instruction in the memory device in communication with the VLIW microprocessor compare or branch units, and configured to perform an action if the first and second instruction match, the fault tolerant software routine comprising a third instruction inserted into a third spatially separate functional computational unit in the VLIW microprocessor at a third different clock cycle and stored in a third memory device in communication with the microprocessor, the first, second, and third instructions being identical; and the software instruction to compare the first, second, and third instructions in the memory devices in communication with a VLIW microprocessor compare or branch units, and configured to perform an action if any of the first, second and third instructions match.

7. A method of processing data in a fault tolerant computer system, comprising: generating a first instruction at a first time interval; generating a second instruction identical to the first instruction at a second time interval; comparing the first and second instructions to each other; performing an action based on the matched first and second instructions; generating a third instruction identical to the first and second instructions at a third time interval if the first and second instructions do not match; matching the first, second, and third instructions to each other; and performing an action based on a match between any one of the first, second, and third instructions.

* * * * *